(12) United States Patent
Xu (10) Patent No.: US 9,164,787 B2
(45) Date of Patent: *Oct. 20, 2015

(54) METHODS AND SYSTEMS FOR RUNNING MULTIPLE OPERATING SYSTEMS IN A SINGLE MOBILE DEVICE

(75) Inventor: Yongyong Xu, Sunnyvale, CA (US)

(73) Assignee: Intellectual Ventures Fund 63 LLC, Las Vegas, NV (US)

( * ) Notice: Subject to any disclaimer, the term of this patent is extended or adjusted under 35 U.S.C. 154(b) by 600 days.

This patent is subject to a terminal disclaimer.

(21) Appl. No.: 12/200,778

(22) Filed: Aug. 28, 2008

(65) Prior Publication Data

US 2009/0037909 A1     Feb. 5, 2009

Related U.S. Application Data

(63) Continuation of application No. 10/710,387, filed on Jul. 7, 2004, now Pat. No. 7,424,601.

(51) Int. Cl.
| | |
|---|---|
| *G06F 9/00* | (2006.01) |
| *G06F 9/24* | (2006.01) |
| *G06F 15/177* | (2006.01) |
| *G06F 13/00* | (2006.01) |
| *G06F 9/46* | (2006.01) |
| *G06F 9/44* | (2006.01) |
| *G06F 9/455* | (2006.01) |
| *G06F 11/14* | (2006.01) |
| *G06F 12/14* | (2006.01) |
| *G06F 9/54* | (2006.01) |

(52) U.S. Cl.
CPC ........ *G06F 9/45545* (2013.01); *G06F 11/1446* (2013.01); *G06F 11/1469* (2013.01); *G06F 12/14* (2013.01); *G06F 9/441* (2013.01); *G06F 9/4401* (2013.01); *G06F 9/4406* (2013.01); *G06F 9/544* (2013.01)

(58) Field of Classification Search
USPC .......... 713/1, 2, 100; 711/152, 153, 162, 165, 711/173; 718/108; 719/319
See application file for complete search history.

(56) References Cited

U.S. PATENT DOCUMENTS

| | | | | |
|---|---|---|---|---|
| 4,747,040 | A | * | 5/1988 | Blanset et al. ................. 718/108 |
| 5,454,110 | A | * | 9/1995 | Kannan et al. .................... 713/2 |
| 5,469,573 | A | | 11/1995 | McGill et al. |
| 5,764,984 | A | * | 6/1998 | Loucks ......................... 719/319 |
| 5,860,133 | A | | 1/1999 | Beaverson et al. |
| 5,923,874 | A | * | 7/1999 | Koenig .......................... 718/100 |

(Continued)

OTHER PUBLICATIONS

Non-Final Office Action on U.S. Appl. No. 12/200,573, mailed Apr. 13, 2011.

(Continued)

*Primary Examiner* — Ji H Bae (57) ABSTRACT

Methods and systems for running multiple operating systems in a single embedded or mobile device (include PDA, cellular phone and other devices) are disclosed. The invention allows a mobile device that normally can only run a single operating system to run another operating system while preserving the state and data of the original operating system. Guest OS is packaged into special format recognizable by the host OS that still can be executed in place by the system. The Methods include: •Change the memory protection bits for the original OS; •Fake a reduced physical memory space for guest OS; •Use special memory device driver to claim memories of host OS; •Backup whole image of the current OS and data to external memory card.

9 Claims, 7 Drawing Sheets perspective view of running multiple OS in single mobile device

(56) References Cited

U.S. PATENT DOCUMENTS

| | | | |
|---|---|---|---|
| 6,047,373 A * | 4/2000 | Hall et al. | 713/1 |
| 6,061,711 A | 5/2000 | Song et al. | |
| 6,067,618 A * | 5/2000 | Weber | 713/1 |
| 6,175,917 B1 * | 1/2001 | Arrow et al. | 713/1 |
| 6,178,503 B1 * | 1/2001 | Madden et al. | 713/2 |
| 6,240,531 B1 | 5/2001 | Spilo et al. | |
| 6,269,409 B1 * | 7/2001 | Solomon | 719/329 |
| 6,327,653 B1 * | 12/2001 | Lee | 713/100 |
| 6,615,303 B1 * | 9/2003 | Endo et al. | 710/260 |
| 6,715,016 B1 * | 3/2004 | Ohno et al. | 710/260 |
| 6,944,699 B1 * | 9/2005 | Bugnion et al. | 710/269 |
| 6,957,286 B1 * | 10/2005 | Cohen | 710/38 |
| 7,194,740 B1 * | 3/2007 | Frank et al. | 718/102 |
| 7,272,671 B2 | 9/2007 | Arndt et al. | |
| 7,424,601 B2 * | 9/2008 | Xu | 713/1 |
| 8,090,938 B2 * | 1/2012 | Xu | 713/100 |
| 2001/0016879 A1 * | 8/2001 | Sekiguchi et al. | 709/319 |
| 2002/0157001 A1 * | 10/2002 | Huang et al. | 713/2 |
| 2002/0194241 A1 * | 12/2002 | Griffin et al. | 709/1 |
| 2003/0093658 A1 * | 5/2003 | Wen et al. | 713/1 |
| 2003/0110331 A1 * | 6/2003 | Kawano et al. | 710/58 |
| 2003/0145191 A1 * | 7/2003 | Park | 713/1 |
| 2003/0154337 A1 * | 8/2003 | Ohno et al. | 710/260 |
| 2003/0204708 A1 | 10/2003 | Hulme et al. | |
| 2003/0237007 A1 | 12/2003 | Ramirez | |
| 2004/0010523 A1 | 1/2004 | Wu et al. | |
| 2004/0205755 A1 * | 10/2004 | Lescouet et al. | 718/100 |
| 2005/0033979 A1 | 2/2005 | Hyser | |
| 2006/0059287 A1 | 3/2006 | Rivard et al. | |

OTHER PUBLICATIONS

Notice of Allowance on U.S. Appl. No. 12/200,573, mailed Aug. 25, 2011.

* cited by examiner perspective view of running multiple OS in single mobile device

Fig.1 two ways to wrap guest code for in-place execution

METHODS AND SYSTEMS FOR RUNNING MULTIPLE OPERATING SYSTEMS IN A SINGLE MOBILE DEVICE

CROSS REFERENCE TO RELATED APPLICATION

This application is a continuation application of Ser. No. 10/710,387 filed on Jul. 7, 2004, now U.S. Pat. No. 7,424,601.

BACKGROUND OF INVENTION

1. Field of the Invention

This invention relates to a technique for running multiple OS (operating systems) in a PDA (Personal Digital Assistant) or other embedded device (such as cellular phone, smart phone, or other mobile devices). More specifically, instead of re-flash the OS images of the mobile device, methods and systems are proposed to run another OS (Guest OS, new OS, other OS) and its applications from within the original OS (Host OS, native OS) in the mobile device, and then return back to the original mobile device, preserving all state and data in the original OS.

2. Prior Art

US Patent Application 20030093658 by Wen, Say-Ling filed on May 15, 2003 is about a Method and system for starting a multiple PDA operating system through a menu. The invention mainly modifies the BIOS booting procedure in a notebook PC installed with multiple OS's. After the notebook PC is turned on, the multiple OS's are detected. These multiple OS's, including a PDA OS and a normal notebook PC basic OS (such as the Windows OS), are displayed on a menu. By ignoring some hardware diagnostic steps during the BIOS booting procedure and only performing hardware diagnoses for those input devices that support menu manipulations, the starting speed of the laptop can be accelerated. The user can thus start any OS by clicking the desired item in the OS menu.

That application assumes multiple OS can be started and run but does not care how to start up different OS, switch between different OS at run time.

US Patent Application 20030154337 by Ohno, Hiroshi disclosed a multiple operating system control method. In this application, An inter-OS control software for switching OS's in operation executed on a single CPU is installed, and plural OS's are made alternately executed. A control program is executed exclusively on one OS, which controls the controlled apparatus. A supervisory control program and a development environment program are executed on another OS, and a memory space is divided so as to make no effect for the operation of the control program. A higher real-time performance and reliability can be established with a single CPU architecture.

That approach is similar to the VMware virtual machine used in many desktop computers. Unfortunately, VMware or virtual machines are too heavy and cannot be applied to mobile devices directly. Furthermore, this application uses a special inter-OS control software which is not needed in our invention.

U.S. Pat. No. 6,178,503 by Madden issued on Jan. 23, 2001 is about managing multiple operating systems on a single computer. That invention addresses the management of multiple operating systems on a single computer and other boot-time problems. A boot-time graphical user interface is described, including support for menus, tabs, non-ASCII characters, and other graphical user interface components in the pre-boot environment. Approaches to organizing the storage and selection of multiple operating systems are also presented, including the use of multiple directories that are identified in operating system boot sectors.

That patent is about user interface in boot management thus covers boot loaders such as Linux boot loader (LILO) or Windows boot loaders used in many desktop computers.

U.S. Pat. No. 6,047,373 by Hall, et al. issued on Apr. 4, 2000 disclosed a Method and apparatus for setting the operating parameters of a computer system.

That patent is related setting operating parameters of a computer system. It does not directly relate to running multiple OS in general.

U.S. Pat. No. 6,067,618 by Weber on May 23, 2000 is regarding multiple operating system and disparate user mass storage resource separation for a computer system. A personal computer system is provided with two or more hard disk drives, each of which may be independently assigned to a different user, a different operating system, or a different set of applications. When the computer system is booted, one of the hard disk drives is selected as the primary drive in order to establish the assigned operational characteristics for the computer as fixed by the unique combination of operating system configuration and applications programs installed on the selected drive.

That patent uses multiple hard disks in traditional desktop computers. However, in most mobile devices, hard disks are not available.

U.S. Pat. No. 5,923,874 by Koenig on Jul. 13, 1999 describes a Resource measurement facility in a multiple operating system complex for reporting data from a sysplex with a plurality of operating system images. It relates to a sysplex with a plurality of operating system images connected through connections comprising a reporter facility for reporting data from the sysplex. The reporter facility has in-storage buffers and data sets in the operating system images containing the reportable data.

That patent differs from our invention in that we do not use sysplex and that patent does not cover ways run multiple OS in mobile devices.

U.S. Pat. No. 5,764,984 by Loucks on Jun. 9, 1998 is about System for multiple co-existing operating system personalities on a microkernel. A dominant personality server is provided to control basic system configuration and resources. Subdominant servers are provided to support applications for other operating systems.

That patent uses microkernel technology, however, although microkernel is a modern technology for desktop or other high-end computer systems, it is not available for most mobile devices.

U.S. Pat. No. 5,469,573 by McGill, III, et al. on Nov. 21, 1995 is about Disk operating system backup and recovery system. It features a data backup procedure and apparatus for backing up and restoring, or otherwise loading a fully configured operating system to the high capacity storage device (e.g., hard disk) of a computer workstation, such as a personal computer. Basically, it utilizes first media and second media to recovering or loading a desired operating system onto a storage device of a data processing system.

The technique in that patent is commonly used on most desktop computers. However, in most mobile devices, due to resource, space and power constraint, hard disks cannot be directly utilized.

U.S. Pat. No. 5,454,110 by Kannan, et al. on Sep. 26, 1995 talks techniques for supporting operating systems for portable computers that describes a set of methods and techniques that together address the deficiencies of the basic input/output system (BIOS) and the advanced basic input/output system (ABIOS) in the context of a pen-based portable computer while retaining much of its strengths in terms of providing an insulating layer between the hardware and the operating system such that the same operating system code body will execute in a variety of hardware platforms.

That patent is can be used to design new mobile devices that contains special BIOS to support multiple OS. Special BIOS is not needed in our invention. Also, that patent does not work for installing new OS or applications on top of existing OS, nor does it cover ways to making multiple operating systems to co-exist.

Booting into multiple Operating Systems (OS) have been around in desktop computers for long time. For example, users can install Windows 95, Windows 2000 or Linux on the same computer and then select which OS to use at boot time. This is possible because desktop computers use hard disk as its main storage. Users can also divide one hard disk into multiple partitions and store different OS images into different partitions or even different directories. When computers start to boot, based on user' choice, the boot loader can load the selected OS image from hard disk into main memory and then start to run that OS.

There are many booting technologies for desktop computers that can handle multiple Operating Systems on multiple hard disks or multiple disk partitions. They can also be used for micro-kernel systems or virtual machine such as VMware. Unfortunately, few of them can also be directly applied to embedded devices or mobile devices due to resource, space or power constraints. For example, most mobile devices do not have hard disks and are very difficult to upgrade or re-flash its system. Even some mobile devices have an alternative storage device to hard disk memory cards, however, currently memory cards are only used to store extra data for the original (native) OS and people cannot boot from the memory card into another OS.

Also, in desktop systems, when user boots to another OS the other OS will re-initialize all of system memory on start because the other OS uses different virtual memory model, or some kernel components that requires remapping of the memory. This allows the guest OS to go use any memory in the system. Then after guest OS finished running, it reboots to select another OS to run. However, this approach is only valid for desktop systems and not working for mobile systems. In a mobile system, host OS and many of its applications also store their data in dynamic memory. Allowing guest OS to claim all memories of the system will also erase data and applications of the host OS so it wont restore after rebooting. If this happens to a mobile system, users may have to "hard reset" the device to go back to its original stage.

So far, we can seldom see multiple OS in one embedded or mobile device (such as PDA, cellular phone, smart phone, or other equivalent mobile devices) because most mobile devices do not store their OS in the hard disk. Instead, at factory time, the whole OS image is burned into ROM. When power is turned on, ROM code is executed to start OS directly from ROM OS image in ROM are extremely difficult to change because re-burn or re-flash requires special equipment and procedure.

To remedy for the shortcoming of regular ROM, some mobile devices such as iPAQ PDA, use Flash ROM in place of ROM so that the whole OS images can be re-flashed or upgraded by software only. However, flashing is still very difficult and dangerous that normal users will almost never need or use it. The process must be done with a desktop computer. It's error-prone, and very risky—if there is any error during the flash, it could have damage the whole device permanently.

Furthermore, even if you can re-flash the original OS to new OS, you lost everything in the original OS. In order to switch back to original OS, you have to re-flash again, but all data in the previous OS are gone. There is no easy way for users to use 2 different OS at the same time or switch between different OS simultaneously. In summary, there is no easy way to install and switch multiple OS in the mobile device.

SUMMARY OF INVENTION

Here are the steps in running guest OS from a host OS (native OS, original OS) in a mobile device (cellular phone, smart phone or other embedded device). This process does not require flashing and can preserve the data of the original OS.

Step 1. Prepare a guest OS image and package it into a special host OS application.

Some mobile devices allow only specific applications to run in their original host OS. For example, Palm OS only recognizes PRC and PDB files that are composed of multiple chunks of "database records". While a guest OS, such as embedded Linux OS, is a regular executable file or a group of files. Thus, it is necessary to convert the Linux OS image into PRC/PDB file format so Palm OS can recognize and run. This process requires splitting Linux kernel image and other related files into different pieces and wrapped them into multiple Database records of a PRC file.

An alternative to this wrapping is to store the guest OS's image as regular file in the memory card directly if the mobile device and host OS support memory card and can access regular files in memory card. The guest OS image can also be started immediately when the card is inserted into the device. This ways, users can carry several guest OS memory card and use any OS any time.

Whenever possible during packaging, there are two approaches allowing in-place execution of the guest OS code to reduce memory usage. One approach is that with compiler support, compiling guest application code to skip those areas required by host OS file format such as record headers as if they are unreachable blocks. Another approach is to use dynamic linking to link each code segment embedded in the wrapper host application by filling out the jump tables at run time.

Step 2. Develop a special boot loader program for the host OS to read, unpack, load and start the guest OS image from the special host OS application.

Once the guest OS image has been packaged or wrapped into special native application, there is a need for special boot loader that understand the guest OS inside the special application. The boot loader must be started from the original host OS of the mobile device. Upon running, it will access the special application, retrieve or unpack the guest OS image from the special application, load the guest OS image into memory, and then start the guest OS.

Another important function for the boot loader is to preserve the state and data of the original OS so it can be restored from the guest OS. This can happened either when guest OS finished running or user wants to temporarily switch away from the guest OS.

The boot loader can be either a standalone host OS application or be packed together with the special wrapper application of the guest OS. The benefit of the latter is that users can directly select the special wrapper application and running. Users could make choices.

Step 3. Guest OS starts running and provides a way to switch to the original host OS.

Once the guest OS is started and running, users can do anything they want in the guest OS. To users and customers, it is as if they are using the whole system equipped with the new OS.

Step 4. To switch from the guest OS, a special exit code (or program) must be invoked to restore the system state and data of the original host OS.

This is opposite to Step 2 of how the boot loader saves the state and data of the original OS. Also, this code may also need to preserve the state and data of the guest OS so users will not lose its work in the guest OS.

In the above steps, the most difficult part is how to preserve the original state and data of the original OS and then later to restore it. Following are several methods for preserving the state and data of the host OS in a mobile device.

The State and data include code of installed applications for that OS and other user's own work. It is normally the boot loader and exit code's job to preserve and restore the previous state and data of the host OS. The methods here can also be applied to preserving the state and data of the guest OS as well.

Method 1: If both OS use the MMU (Memory Management Unit) unit of the mobile device which supports memory protection, the boot loader can manipulate the memory protection bits for pages of the memory. It can change attributes of all memories used in the original OS (data and code) from read/write to read-only (not write-able) or even not accessible. Then those memories of the host OS can no longer be modified after switching to guest OS because guest OS share the same memory settings.

Guest OS can only modify/use memories that have not been marked as read-only, which corresponds to free memories in the host OS. On switching from the guest OS, the exit code simply restore the memory protection bits of the memories of the host OS.

Some MMU does not support memory protection on physical memory but only virtual memory. As long as both OS can share the same virtual memory, this method works as well.

If such MMU is not available, or two OS use different memory architecture, method 1 does not work. We can still use the next 2 methods.

Method 2: Move/copy data of the host OS to top of the system memories and faked a reduced memory environment to the guest OS.

When the guest OS starts, it will think that it is running on a reduced memory device and will never touch memories above the told highest available memory that are used to backup the host OS data, thus the data and state of the host OS is preserved.

Method 3: Use a special (virtual) memory device driver loaded during the initialization of the guest OS to claim memories of the host OS.

The special memory device driver can claim those memories currently used by the host OS (including data, code and runtime) and keep its content from being modified by other programs of the guest OS until guest OS exit. The use of virtual memory device, in effect, converted the regular read-write memory of the host OS into memory blocks that are inaccessible to the other part of the guest OS. This way, the state and data of the host OS are also preserved.

Generally, this method does not require moving memories of the original OS. However, in the rare cases of conflict when both OS need to use a same memory location, It may temporarily move the conflicted memory of the host OS to free areas and move back upon termination of the guest OS.

Method 4: If, none of the above methods can be used, we can backup the current state of the host OS to an external memory card such as Compact Flash (CF) memory card or Secure Digital (SD) memory card.

More and more mobile devices start to support memory card now. For example, Palm support SD card, many windows CE devices support CF card. This method can be used for more and more mobile devices. The process is also easy: boot loader first save the whole OS memory image into external memory device and an exit code restore the host OS from the memory image from the external card upon retuning from the guest OS.

In addition to data in the memory, the state of the current running OS in a mobile device may contain many other IO peripheries. Sometimes, switching between OS requires re-initializing those IO devices. However, almost of in all the time, we can store the current state of the IO devices into memory as well. So as long as we can preserve and restore the memory contents of OS, preserving and restoring states of external IO devices is a trivial task.

DETAILED DESCRIPTION

Figure 1:
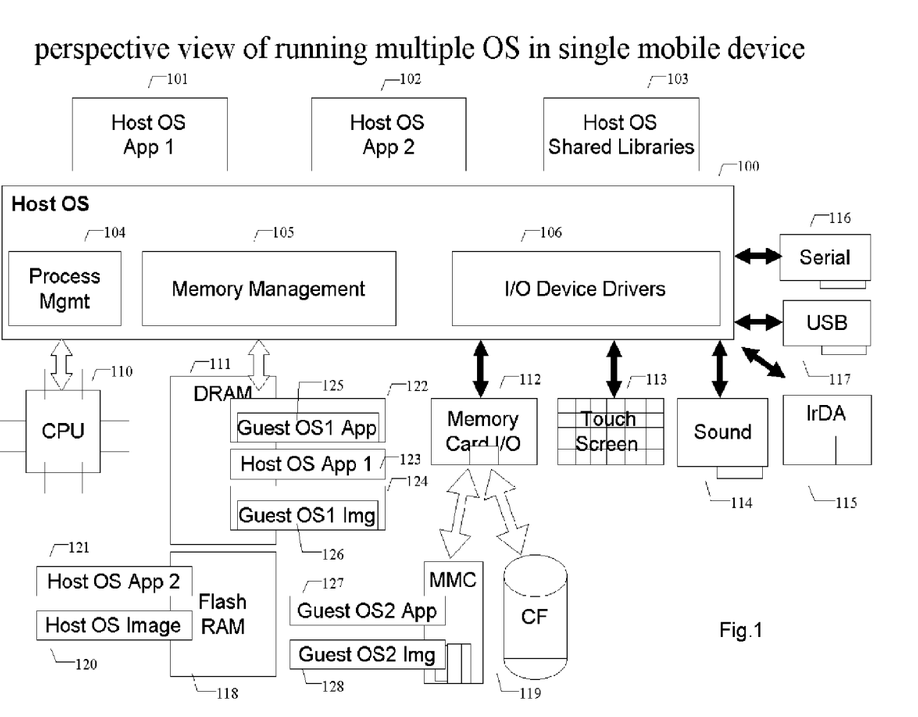
FIG. 1 is the perspective view of running multiple OS in single mobile device.

In FIG. 1, a typical mobile device contains two parts: hardware and software. Hardware include: CPU (110), two kinds of RAM DRAM (Dynamic RAM) (111) and Flash RAM (118), external memory card interface (112) which can plug in an external MMC Card or CF card (119), Touch Screen (113), Sound card (114), IrDA infrared controller (115), Serial Interface (116) and USB controller (117).

On software side, the central part is the original host OS (100) which controls all other software and hardware of the mobile device. In kernel of the host OS, there are multiple OS components that handle different tasks, such as process manager (104), memory manager (105) and other I/O device drivers (106). Outside the host OS are many host applications running (101, 102 and 103). Those host OS applications are compiled and linked in the binary format of host OS and can only executed under host OS. The images of original host OS or applications can either be stored in the flash RAM (118) or dynamic RAM (DRAM) (111). The difference between two kinds of RAM is that contents in flash RAM can persistent after power loss while contents in DRAM will be erased after each power loss. Because of that difference, in most cases, host OS image (120) will be stored in flash RAM, some standard host applications (121) will also be stored in flash RAM and user installed host applications (123) will be stored in DRAM instead.

Guest OS can be loaded into mobile devices in two ways. One option is to embed guest OS or applications inside a special host application. In FIG. 1, the image of guest OS1 (126) is wrapped into host application (124) and guest OS1 application (125) is embedded in the host application (122).

The reason for wrapping is that many mobile devices uses specialized file format under host OS otherwise host OS is unable to recognize them at all. Palm OS, for instance, only recognize PRC or PDB files conforming to a particular database format regardless whether they reside in DRAM or Flash RAM. PRC file or PDB files compose of multiple records with an index at the beginning of the file. Each record contains a special header storing its size, modified date and other attributes. In another word, for such OS, it is not possible to directly load regular files of guest OS or application image (125, 126).

So for such OS, a wrapper is required. The wrapper is a special host application that does nothing but embed or package image of guest OS or application into its records. To the original host OS, the wrapped application is a regular host application so it can be loaded or run. When it is executed, the wrapper can unpack the contents of the embedded guest OS or applications to memory so the boot loader can start them.

To reduce memory usage, sometimes it is necessary to run embedded guest OS or applications image in-place, i.e. without unpack and re-arrange into another free memory spaces. This can be difficult in some cases if the host OS uses special file format that break a single files into multiple segments. For example, PDB Files used in Palm OS is divided into multiple records, each record contains a small header storing its meta information. If we simply store the image of guest OS or application directly into each data section of the records, there will be many small headers among data sections in memory after the PDB file is loaded. Because of those extra headers, guest OS is no longer a whole piece can cannot run in place.

Figure 2A:
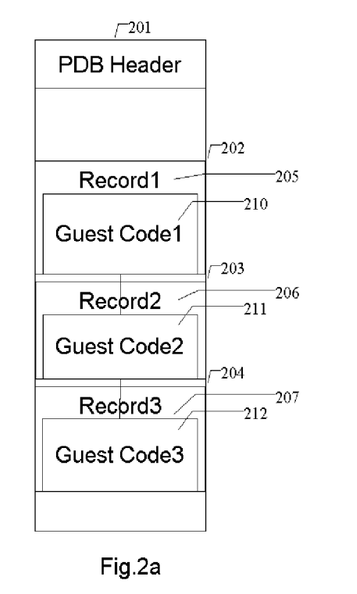
FIG. 2 shows two ways to wrap guest code for in-place execution.

With modification to the guest application or OS code, there is workarounds to allow execution of guest application in place as shown in FIG. 2. First, assume that host OS loads all records sequentially in memory. If compiler support, it is possible to compile guest application code to skip those areas occupied by record headers as if they are unreachable blocks, i.e. in guest code, headers will be treated as unused, fixed location code or data segment. In FIG. 2(a), each record (202,203,204) has a corresponding header (205,206,207) and guest code block (210, 211,212). Headers will store meta information of the record. During linking time, since header areas are filled with unused data segment, the linker will generate a JUMP instruction at the end of previous code block (210, 211) to jump to the beginning of next code block (211, 212). Later, when guest application is wrapped into a PDB file and start to run in memory, the memory layout within host OS matches the requirement of the guest application and the guest application can run in-place.

Figure 2B:
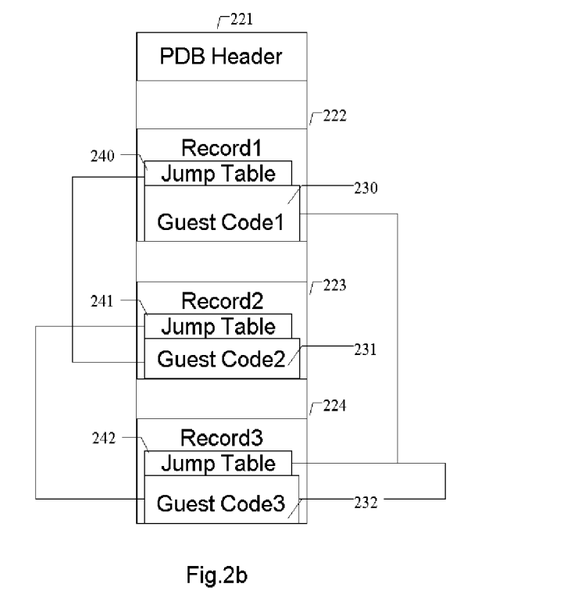

If host OS does not load each record sequentially, instead, each record may be loaded into arbitrary memory location, as shown in FIG. 2(b), then this first approach does not work as it is not possible to statically link the code of guest application to skip each record header.

In that case, the second workaround is to use dynamic linking. In FIG. 2(b), each code of guest application are still embedded in one record of wrapper application. For instance, guest code 1 (230) is embedded in record 1 (222), guest code 2 (231) is embedded in record 2(223), and guest code 3 (232) is embedded in record 3(224). Jumps inside each code blocks are relative jumps so each guest code block is movable in memory space.

To support code jumping among code blocks, in each guest code segment there is a jump table (240,241 and 242 respectively). The code of guest OS or guest application is then compiled in a way that it inter-code jumps or calls must go through the jump table. And the jump table can be filled at runtime. For example, when guest code 3 (232) want to call guest code 1, it will not call guest code 1 directly, but calls into its jump table (242).

At runtime, the guest code loader will then fill the jump table with the real address of each guest code blocks after all the records are loaded in the memory. Instead of copy the whole images into another space, only jump table of each record needs to be modified. This can significant reduce the memory usage when start running guest code.

Although similar to traditional dynamic linking technology, this method differs in that jump table are filled by host OS loader before guest OS even started to run. The linking is performed from the wrapper host application also.

Figure 3:
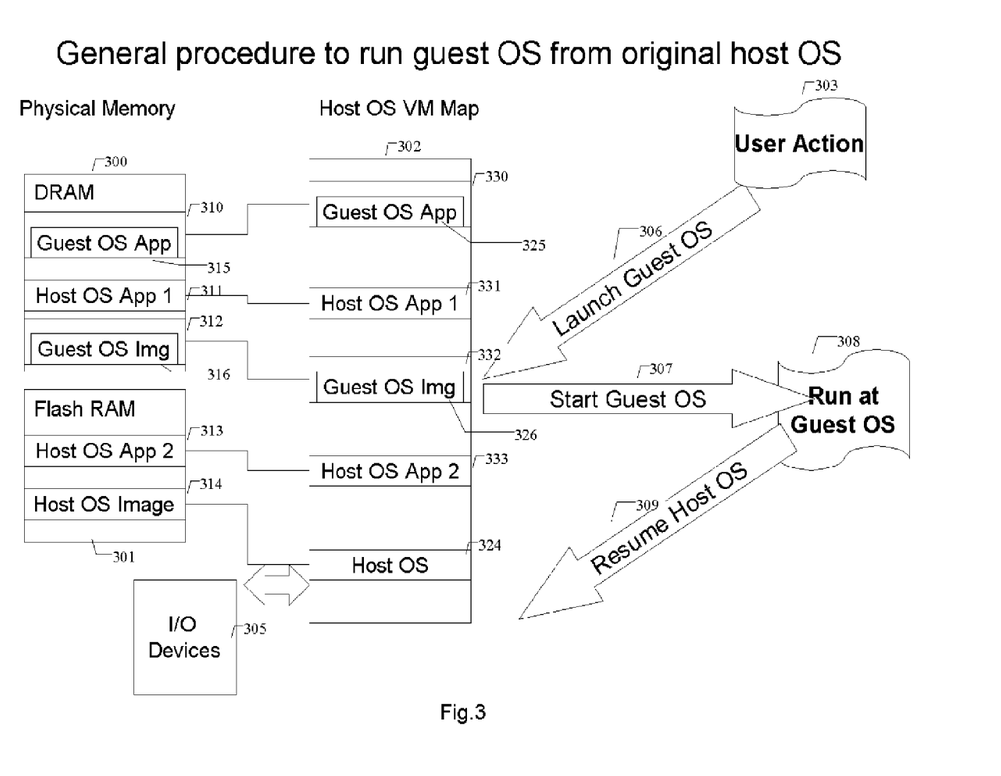
FIG. 3 shows the general procedure to run guest OS from original host OS.

FIG. 3 shows general steps to run a guest OS or application from within the host OS in a mobile device.

Before running guest OS or application, host OS takes control of the mobile device including all its memory-DRAM (300) and Flash RAM (301). Host OS (34) and application 2 (313) reside in Flash RAM (301). DRAM contains another host application 1 (311) and guest OS and applications. Guest OS application 1 (316) is already wrapped inside host application (312) and guest application 1 (315) is also wrapped inside a Host application (310).

In many systems, virtual memory is used to map physical memory into a virtual memory space. In virtual space, host OS is shown as (324), host application 1 as (331), host application 2 as (333). Guest application image (325) is wrapped within host application (330) and guest OS image (326) is wrapped inside host application (332).

When the user wants to start guest OS from the host OS (303), the launching process of guest OS (306) started. The process will first start the boot loader of the guest OS, which will in turn prepare the guest OS image and boot into the guest OS. The boot loader can be a stand alone host application or part of the wrapper application (332) or (330).

The boot loader runs under host OS, it will first preserve current state and data of the host OS and then setup the starting environment for guest OS to boot from. Before the guest OS (326) take control, it can also preserve the states of external I/O devices (305) to memories. The preservation of host state and data will be discussed later.

The other tasks of the boot loader also includes: preparing virtual memory space for the guest OS (316), unpacking guess OS image (326) from the wrapper (322), mapping guess OS image (326) to the virtual memory space, initializing external I/O devices, and finally transferring control (307) to the guest OS image (326) by execute guest code in place.

Once guest OS takes control of the mobile device (308), it may load other guest OS application (325) control external I/O devices (305) directly. From its point of view, it may think it is the only running system of the mobile device. If it requires to access information originally in the host OS, it may do so through a special device driver. This is different from VMware for desktop systems where both OS running at the same time for the simple reason: mobile device is too resource constraint to exploit such expensive and complex systems.

In fact, running two operating systems simultaneously like VMware is only possible with help from special hardware either there is a dual CPU or the CPU must support the concept of virtual machine. It then starts the second OS in a separate Virtual machine and CPU then redirects all privileged instructions from the second CPU's into Virtual Machine Manager (VMM) of the original OS. It is the VMM that simulate a new "virtual hardware environment" for the second Virtual Machine (VM) and the guest OS inside.

Modern operating systems and CPU (x86) on desktop systems is one example. VMware is another example. If CPU is powerful even in mobile device, this approach can be used too. Actually the method 1 described later can be used also in a virtual machine environment.

Since most mobile system use low end CPU that is not as powerful as the desktop ones, and there are much less memory available for mobile and embedded systems, this virtual machine approach may not be applicable. Anyway, this save-and-restore approach works no matter how low-end the system is. It is the most practical approach for most cases.

After the guest OS (326) or application (325) finished running, it may return control back to the original host OS. This can be permanent or temporary depends on whether the guest OS finished its work or it just want to temporarily switch back to the original host OS.

To switch back to the original host OS, there are multiple ways. Of them the simplest way is to reboot the system. This is not covered here because rebooting may destroy all data in the RAM and it may not possible to return the original state of the original host OS.

In general, on returning from the guest OS (309), the guest OS must also persistent all its operations and save its running state in the system if it want to come back again for a temporary switch. This saving process can also use the same mechanism for preserving the original host OS, as described below.

In the end, a special code called exit code must be executed to restore the state and data of the original host OS. The restoring process depends on which method it is using. Once the state and data (including states of the IO devices) of the previous running host OS is restored, control can be transferred back to original host OS to resume its operation before running guest OS.

Next let's look at different methods that can be used in preserving the state and data of the original host OS when starting guest OS.

Worthy of mention is that although many mobile devices use both dynamic RAM, static RAM and Flash RAM together. Since writing to flash RAM are rare in most cases since it requires special process and normally only for system upgrade, we can treat Flash RAM as regular ROM. i.e. There is no need for preserving flash RAM. We only need to preserving dynamic or static memories used to store user applications or runtime data. In addition, most memory card are accessed through specific IO command, there is no need to preservation data in memory card as well.

FIG. 4 to FIG. 7 show methods to preserve current state and data of the original host OS during starting a guest OS.

Figure 4:
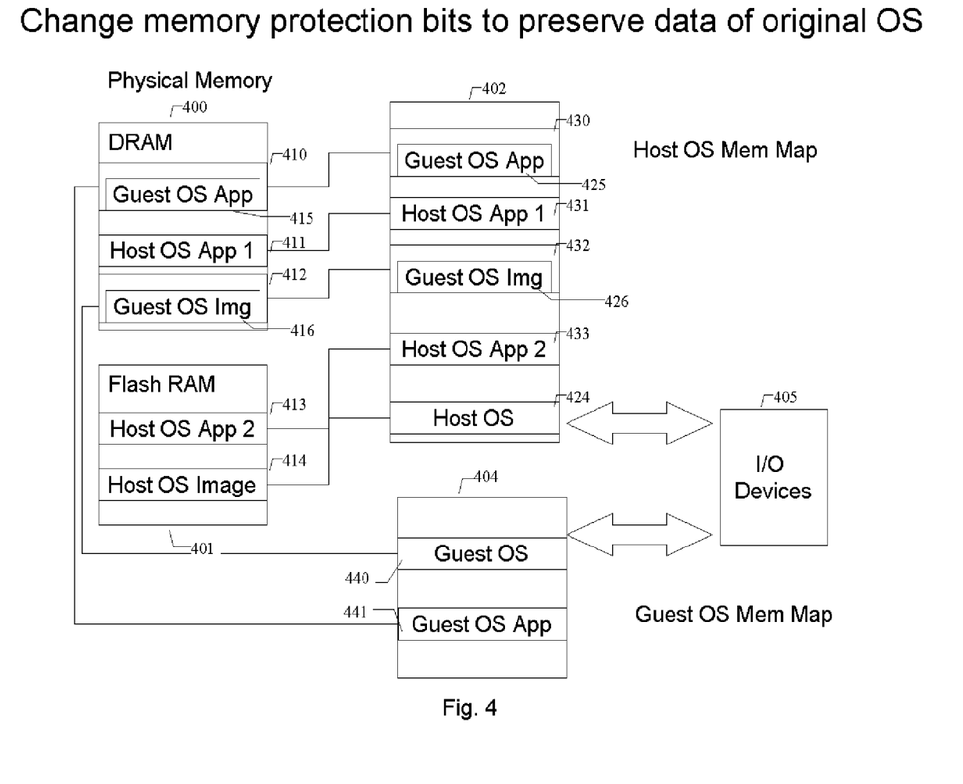
FIG. 4 shows how method 1 was used to preserve the original OS's data in memory while running the guest OS.

FIG. 4 shows the first method if MMU (Memory Management Unit) of the mobile device support memory protection and both OS use the same architecture. The actual physical memories are represented as dynamic memory (400) and flash memory (401). Memory space of host OS and guest OS are represented as (402) and (404). Guest OS (440, 416, 426) originally is wrapped in a wrapping application (412, 432). Guest application (441, 415, 425) is wrapped in another wrapping application (410, 430). Either OS can communicate with external I/O devices of the system (405).

Before the boot loader transfer control from host OS (424) to the guest OS (440), it will manipulate the memory protection bits of memory block used by host OS as read-only or non-accessible from memory space of the guest OS. Data used by host OS and applications are protected from guest OS (440). This method works on physical memory or virtual memory spaces as well. Furthermore, for those rare memory blocks that must to be shared by both OS (such as interrupt vector address), they can be backup to another free memory block and then mark as protected.

Later, when guest OS (440) is launched, controls the system and running other guest OS applications (441), it will not write those memories of the host OS (430, 431, 432, 433, 434). If the boot loader can mark those memories as non-accessible, then guest OS will not find them at all. Those memories seem to be non-existent or at least, not write-able to the other guest OS applications. In either case, memories of the host OS survived through guest OS session and can restore to the original state of the host OS.

However, not all mobile devices and their operating systems support the memory protection mechanism the same way that this method can be applied. This approach, though looks straightforward and easy, also has some limit.

Figure 5:
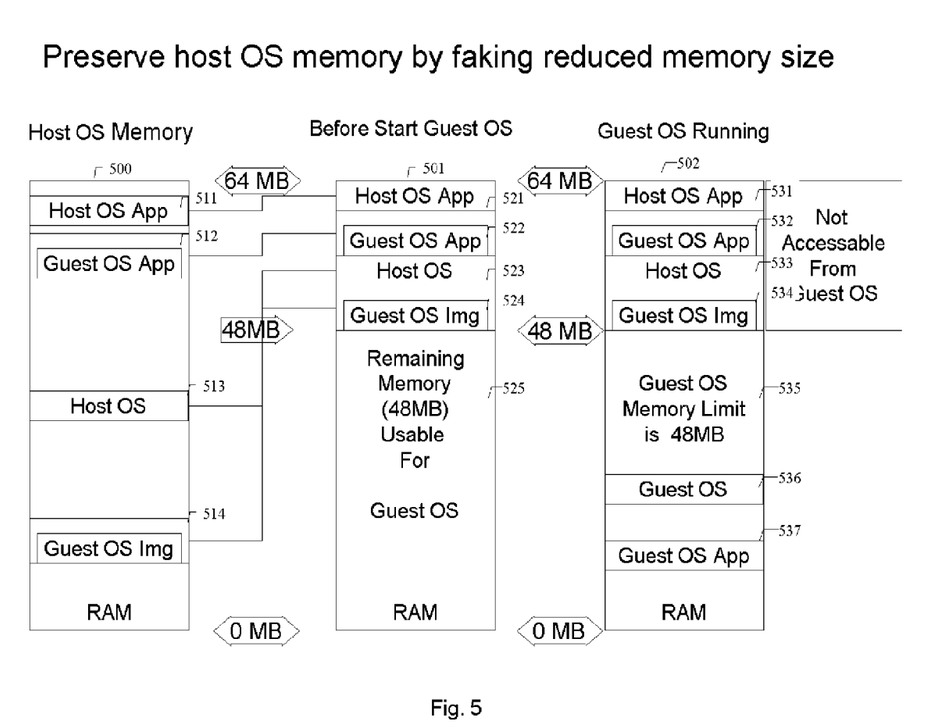
FIG. 5 shows how method 2 was used to preserve the original OS's data in memory while running the guest OS.

Instead of relying on the memory protection provided by the hardware, FIG. 5 shows another method that works for almost all mobile system, memory architecture and OS. This method backup the data of the original host OS into upper memory spaces and fake a reduced memory space to the guest OS.

In FIG. 5, (500) represents normal memory usage in host OS, (501) and (502) represents memory use before and after guest OS is started. Before host OS (513) transfer controls to guest OS (536), the boot loader first scans all memory blocks used by host OS and applications (511,512,513,514), backup them to the highest physical memory address (521,522,523, 524). During this backup process, it also keeps track of the original memory location and other memory attributes such as protection bits to be restored in the future.

Those backup memory blocks (521,522,523,524) will be allocated downward from the highest possible memory address so all low address memory can be freed out for guest OS to use. For example, if the initial system has 64 MB total memories, the backup data of host OS and application use 16 MB, then the backup memory will occupy memory address space from 48 MB to 64 MB (521-524). After backup the memory space from 0MB to 48 MB (535) are basically read to use.

Once all data of host OS and applications (511,512,513, 514) have been backed-up to the high memory space (521, 522,523,524), the remaining memory space (525) can be exclusively used by guest OS. When boot loader start guest OS, instead telling it that the total system memory is 64 MB, it tell the guest OS that the total system memory is only 48 MB. The guest OS will be running under a reduced memory environment. However, it has total control over all the memories below 48 MB it can do erase them, initialize with different values. In other words, guest OS does not need to care about preserving memories of host OS as long as it believes that the system only has 48 MB instead of real 64 MB.

To fool the guest OS, in some cases, it is easy enough to modify some system register or IO port before starting guest OS or provide a parameter to the booting process of the guest OS. In other cases if the system does not provide the hardware support for such cheating, it is usually not difficult to modify memory detection module in guest OS to ignore memory spaces above the told high memory address. Thus, guest OS (536, 537) continue to run as long as it believes that the highest available memory (535) is the memory address right below the backup address of the data of host OS (531,532, 533,534).

In the given example, once the guest OS started, it has total control on its own memory space from 0-48 MB (535). It won't touch the physical memory (531,532,533,534) from 48 MB to 64 MB where the system and application data of host OS are backup-ed since it think that current memory limit is only 48 MB. This is the biggest advantage of this method. Later, when guest OS quits or returns back to the original host OS, The only thing exit code need to do is to restore all memory blocks from the backup to where they are originally located.

This method also works when guest OS uses physical memory directly. It also worked when guest OS setup its own virtual memory manager on top of the allocated physical memory as long as the virtual memory manager honor the total memory limit it acquired during boot. This can be done by simply not mapping physical memory space above the boundary! In the case where memories are divided into several banks or memory addresses are not continuous, this method can also be adjusted. For example, we can backup host data to special areas of the memory banks or locations and then mask out those memories by sending special instructions, disabling memory banks and other means. This also has the same effect of hiding those backup memories from being accessed in the guest OS.

This method also works when we want to launch a second guest OS from within the (first) guest OS. The working mechanism is the same—boot loader (this time, is an application of the first guest OS) will try to backup all system and application data of the first guest OS to highest memory address it detected, in the given example, 32 MB to 48 MB. It will not overlap with memories of the original host OS backup because the first guest OS believes that there are only 48 MB physical memory in the system. The only shortcoming is that each new OS launch will reduce the "faked memory size" by the amount of backing-up current running OS.

Figure 6:
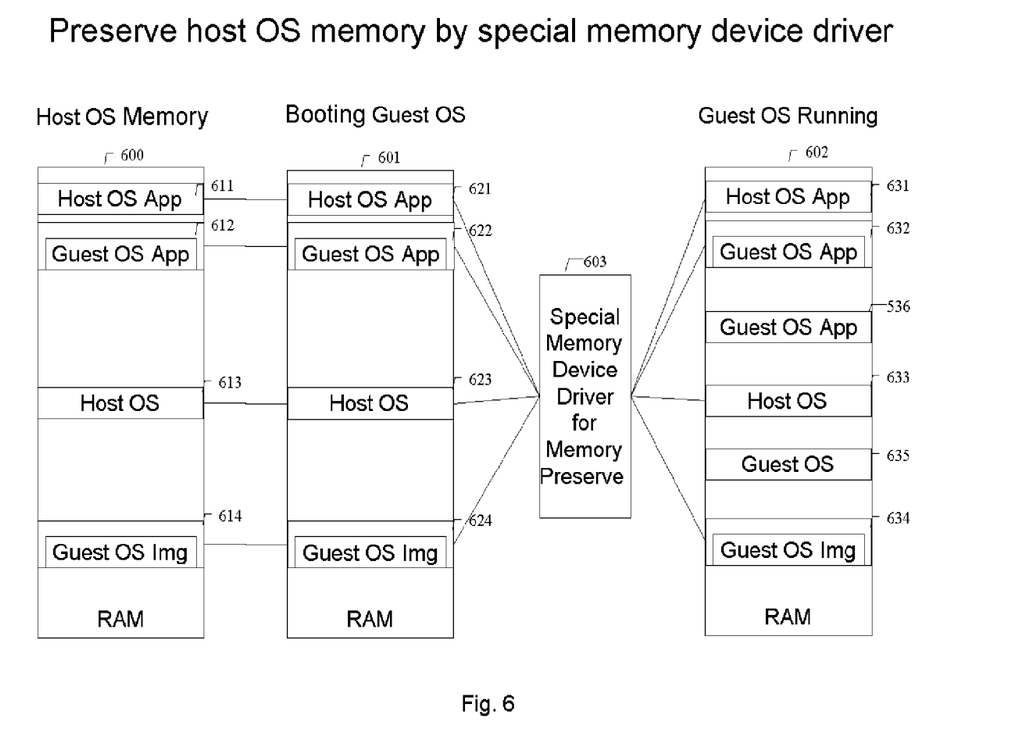
FIG. 6 shows how method 3 was used to preserve the original OS's data in memory while running the guest OS.

There is one disadvantage of this method. That is: it requires physically backing-up all the memory blocks used by the original host OS. Though it is much faster then backing up to external storage, sometimes, this backing up is considered non-efficient. FIG. 6 describes a method to preserve the state and data without actually moving or backing up data.

This method use a special device driver in the guest OS shown as (603) in FIG. 6. Most operating systems will load device drivers on system boot. This special device driver (603) will do the task of locking memories of host OS and prevent guest OS from using it. In the picture, (600) shows memories of the original host OS, (601) and (602) show the process. When guest OS is started, the boot loader, started as a host application, collects all information about currently used memories (611,612,613,614) of the host OS (600), such as memory starting address and block size. Then it will pass those parameters to the special memory device driver (603) of the guest OS.

The only purpose of this special memory device driver (603) is to claim memory spaces of the memory blocks (621, 622,623,624) of the host OS and mark them as reserved memory (or ROM) in the kernel of the guest OS. Then those memories cannot be shared or modified by any other drivers or programs in the guest OS. It is not a device driver talking to real devices, so we can view it as a virtual memory device driver as it effectively turns those memories into a ROM, to the rest of the system. To other parts of the guest OS including other device drivers or application programs, the memories (631,632,633,634) are already claimed, used, read-only or not accessible. The possibilities for guest OS to rewrite or modify those memory blocks are eliminated.

One requirement of that special memory device driver is that it must reside in the kernel of the guest OS to guard of the memory access from other kernel processes of guest OS. We need a device driver to prohibit not only user applications but also operation system itself to modify those protected memory blocks.

If some memories can be claimed, such as interrupt vector spaces, then the device driver can make a backup for those memories that is also required by the guest OS when it is initialized. Later, when the guest OS exit, it can restore them back.

The special (virtual) memory device driver can serve a different purpose as well. It can provides limited memory or data sharing between guest OS and host OS. For example, it can allow guest OS to read the phone book entries of the host OS. This is useful in some cases where users can benefit from this kind of data sharing. The driver will control what host data (application data or system data) can be shared and how they are accessed and used. It may even implement a file system driver to map the shared data so normal applications in the guest OS can access them as well.

In addition to this method, there is another method for preserving the state and data of the original host OS when starting a guest OS. This requires the help of an external storage card such as flash memory card or MMC card shown as (702) in FIG. 7.

Figure 7:
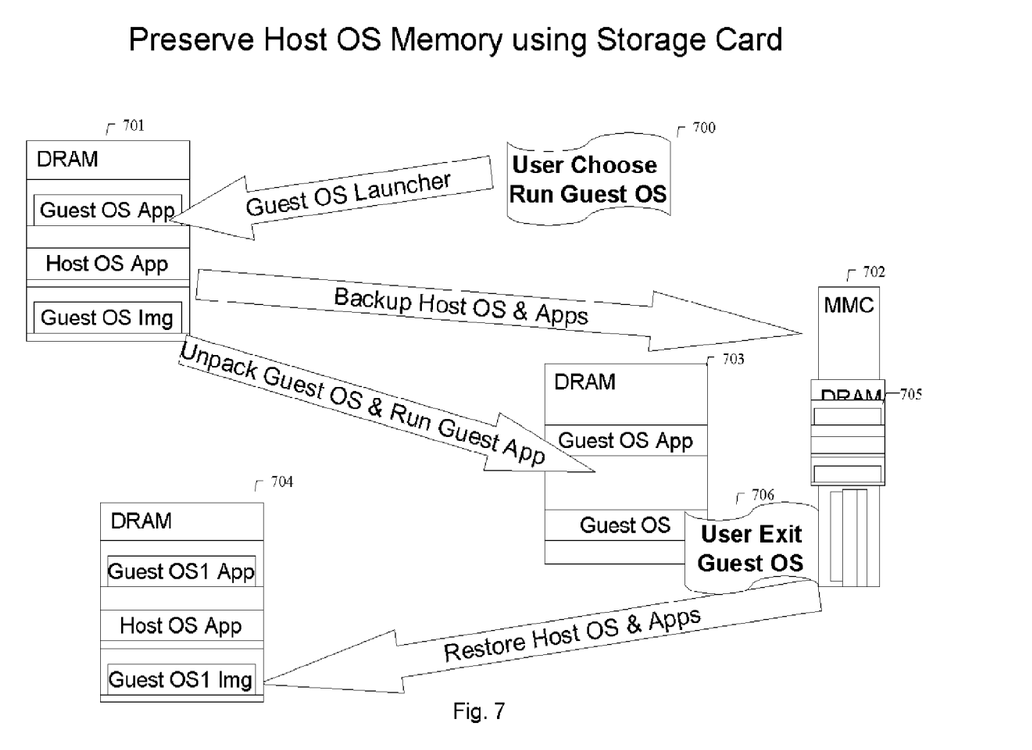
FIG. 7 shows how method 4 was used to preserve the original OS's data in memory while running the guest OS.

In this case, when a user (700) want to start the guest OS, the boot loader starts first and tries to make a backup of the current state and data of host OS and application data (701) to an external memory card (702) so that in the future the current host OS, with all its data and applications can be restored later to main memory (704). It is similar to the hibernation process of a laptop computer. However, we only need to backup memories that have been used by host OS and not those in flash memory to save space. Sometimes, compression of the data before backup may further reduce the amount of data actually written to the external memory card (702).

After the backup data has been stored to the external memory card or MMC (705), the guest OS is started as shown in FIG. 3: Guest OS or application images are unpacked, OS is started and applications start to run.

When the user what to terminate the execution of guest OS (706), the exit code at the end of guest OS will restore the saved image (705) of host OS from the external memory card (702) back to main memory (705). Once the saved image has been restored in the system, original host OS and applications are resumed.

Also the memory images preserved can be saved to memory cards or send over network as a backup point and being used or restored later, or it can transferred to another mobile device or emulators for mirroring purpose.

In all the above 4 methods, after the guest OS or application has been started, returning back to original host OS is almost the reverse of what we have done. As long as we can restore the original host OS memory image, we can resume the original host OS execution as if there nothing happened. This includes restoring the CPU or IO devices state that have been modified. Since it is always possible to backup those IO state information such as registers, ports to memory blocks before switching OS, it is also not a problem to restore all the backup-ed state from the preserved memory blocks on return.

All methods disclosed here can also be applied when multiple guest OS are running and coexist at the same time or switch among one another. For example, if from within the guest OS1, there is need to start a second guest OS2, then to the guest OS2, guest OS1 is now the hosting OS—as long as we can preserve all contents of guest OS1, this should not be a problem. Of course, still guest OS1 has to cover the backed up data of the original host OS because we may still need to switch back to the original host OS. Thus, switching among all different OS s in a non-destructive way is working the same way.

The invention claimed is:

1. A mobile device comprising:
   a memory including a host operating system and a guest operating system, wherein an image of the guest operating system is wrapped into a host operating system application, wherein the host operating system executes the host operating system application to start the guest operating system, after which guest operating system executes the guest operating system code; and
   a processor configured via programming to:
      store a state of the host operating system in a first portion of the memory;
      copy the first portion of the memory onto an external memory device to protect the state of the host operating system such that the guest operating system cannot use the state of the host operating system;
      load the guest operating system into a second portion of the memory; wherein at least a portion of the first portion of the memory is used;
      transfer control to the guest operating system;
      receive an exit code from the guest operating system, wherein the exit code is generated at the termination of the guest operating system;
      restore, based upon receipt of the exit code, the copied first portion of the memory from the external memory device back to the memory; and
      resume operation of the host operating system after the copied first portion of the memory is restored from the external memory device.

2. The mobile device of claim 1, wherein the processor is further configured via programming to use a bootloader to copy the first portion of memory to the external memory device.

3. The mobile device of claim 1, wherein the processor is further configured via programming to compress the first portion of the memory before the first portion is stored on the external memory device.

4. A method comprising:
   protecting, at a processor, a first portion of a memory such that a guest operating system cannot use the first portion of the memory, wherein protecting the first portion of the memory includes copying the first portion of the memory onto an external memory device, wherein an image of the guest operating system is wrapped into a host operating system application, wherein the host operating system executes the host operating system application to start the guest operating system, after which guest operating system executes the guest operating system code;
   storing a state of the host operating system in the first portion of the memory;
   copying the first portion of the memory onto an external memory device to protect the state of the host operating system such that the guest operating system cannot use the state of the host operating system;
   loading the guest operating system into a second portion of the memory; wherein at least a portion of the first portion of the memory is used;
   transferring control to the guest operating system;
   receiving an exit code from the guest operating system, wherein the exit code is generated at the termination of the guest operating system;
   restoring, based upon receipt of the exit code, the copied first portion of the memory from the external memory device back to the memory; and
   resuming operation of the host operating system after the copied first portion of the memory is restored from the external memory device.

5. The method of claim 4, wherein copying uses a bootloader to copy the first portion of memory to the external memory device.

6. The method of claim 4, further comprising compressing the first portion of the memory before the first portion is stored on the external memory device.

7. An article of manufacture including a non-transitory computer-readable medium having instructions stored thereon that, if executed by a computing device, cause the computing device to perform operations comprising:
   protecting, at a processor, a first portion of a memory such that a guest operating system cannot use the first portion of the memory, wherein protecting the first portion of the memory includes copying the first portion of the memory onto an external memory device, wherein an image of the guest operating system is wrapped into a host operating system application, wherein the host operating system executes the host operating system application to start the guest operating system, after which guest operating system executes the guest operating system code;
   storing a state of the host operating system in the first portion of the memory;
   copying the first portion of the memory onto an external memory device to protect the state of the host operating system such that the guest operating system cannot use the state of the host operating system;
   loading the guest operating system into a second portion of the memory; wherein at least a portion of the first portion of the memory is used;
   transferring control to the guest operating system;
   receiving an exit code from the guest operating system, wherein the exit code is generated at the termination of the guest operating system;
   restoring, based upon receipt of the exit code, the copied first portion of the memory from the external memory device back to the memory; and
   resuming operation of the host operating system after the copied first portion of the memory is restored from the external memory device.

8. The article of manufacture of claim 7, wherein copying uses a bootloader to copy the first portion of memory to the external memory device.

9. The article of manufacture of claim 7, wherein the operations further comprise compressing the first portion of the memory before the first portion is stored on the external memory device.

* * * * *